United States Patent
Blankenship et al.

(10) Patent No.: US 7,590,044 B2
(45) Date of Patent: Sep. 15, 2009

(54) METHOD AND APPARATUS FOR INTERLEAVING\WITHIN A COMMUNICATION SYSTEM

(75) Inventors: T. Keith Blankenship, Streamwood, IL (US); Yufei Wu Blankenship, Streamwood, IL (US); Brian K. Classon, Palatine, IL (US)

(73) Assignee: Motorola, Inc., Schaumburg, IL (US)

( * ) Notice: Subject to any disclaimer, the term of this patent is extended or adjusted under 35 U.S.C. 154(b) by 730 days.

(21) Appl. No.: 11/273,309

(22) Filed: Nov. 14, 2005

(65) Prior Publication Data

US 2007/0109953 A1    May 17, 2007

(51) Int. Cl.
*H04J 9/00*  (2006.01)
*H04L 5/04*  (2006.01)
*H03K 7/10*  (2006.01)

(52) U.S. Cl. ...................... 370/205; 332/108
(58) Field of Classification Search ......... 370/203–205; 332/108
See application file for complete search history.

(56) References Cited

OTHER PUBLICATIONS

IEEE P802.16-2004/Cort/D5, Sep. 12, 2005, p. 35, 184.*
C. Berrou et al., "Designing good permutations for turbo codes towards a single model" IEEE International Conference on Communications, 2004, vol. 1, pp. 341-345.
IEEE Standard for Local and Metropolitan Area Networks—part 16: "Air Interface for Fixed Broadband Wireless Access Systems" Cover sheet and pp. 598-599, 2004.

* cited by examiner

*Primary Examiner*—Seema S Rao
*Assistant Examiner*—Jianye Wu

(57) ABSTRACT

A method and apparatus for interleaving within a communication system is provided herein. More particularly parameters for a convolutional turbo code interleaver are provided, and interleaving takes place utilizing the new parameters. The new parameters generate interleavers that have the correct turbo code behaviors of improving performance with increasing block size and an error floor well below a block error rate of $10^{-4}$. Furthermore, the parameters have no implementation impact. Interleaving in accordance with the preferred embodiment of the present invention can achieve a block error rate of $10^{-4}$ at a signal-to-noise ratio that is at least 0.5 dB, and in some cases up to 1.3 dB, smaller than that which can be achieved with the code using the existing parameters.

8 Claims, 2 Drawing Sheets

METHOD AND APPARATUS FOR INTERLEAVING WITHIN A COMMUNICATION SYSTEM

FIELD OF THE INVENTION

The present invention relates generally to interleaving and in particular, to a method and apparatus for interleaving within a communication system.

BACKGROUND OF THE INVENTION

Communication systems take many forms. In general, the purpose of a communication system is to transmit information-bearing signals from a source, located at one point, to a user destination, located at another point some distance away. A communication system generally consists of three basic components: transmitter, channel, and receiver. The transmitter has the function of processing the message signal into a form suitable for transmission over the channel. This processing of the message signal is referred to as modulation. The function of the channel is to provide a physical connection between the transmitter output and the receiver input. The function of the receiver is to process the received signal so as to produce an estimate of the original message signal. This processing of the received signal is referred to as demodulation.

Analog and digital transmission methods are used to transmit a message signal over the communication channel. The use of digital methods offers several operational advantages over analog methods, including but not limited to: increased immunity to channel noise and interference, flexible operation of the system, common format for the transmission of different kinds of message signals, improved security of communication through the use of encryption and increased capacity.

With digital communication, user information such as speech is encoded into sequences of binary information symbols. This encoding is convenient for modulation and is easily error-correction coded for transmission over a potentially degrading communication channel. In order to deliver reliable information in a noisy environment, many techniques (e.g., convolutional encoding, interleaving at the symbol level, . . . , etc.) are utilized to improve the quality of the demodulated signal. Although these techniques greatly improve the reliability of information transmitted, situations exist where current techniques are inadequate to provide reliable information in noisy environments. An example of this is the convolutional turbo code (CTC) in the orthogonal frequency division multiple access (OFDMA) mode of IEEE 802.16. The turbo interleaver of the CTC uses an almost regular permutation $$P(j)=(P_0 j+d(j)) \bmod N \quad (1)$$

where $0 \leq j \leq N-1$ is the sequential index, $P(j)$ is the permuted index, N is the information block size in bit couples, $P_0$ is a number that is relatively prime to N, and $d(j)$ is a dither vector. For example, in IEEE 802.16 $d(j)$ assumes the form $$d(j) = \begin{cases} 1, & j \bmod 4 = 0 \\ 1+N/2+P_1 & j \bmod 4 = 1 \\ 1+P_2 & j \bmod 4 = 2 \\ 1+N/2+P_3 & j \bmod 4 = 3 \end{cases} \quad (2)$$

for $0 \leq j \leq N-1$. Equations (1) and (2) are equivalent to the following pseudocode:

for j=0, . . . , N−1
switch j mod 4:
case 0: $P(j)=(P_0 j+1) \bmod N$
case 1: $P(j)=(P_0 j+1+N/2+P_1) \bmod N$
case 2: $P(j)=(P_0 j+1+P_2) \bmod N$
case 3: $P(j)=(P_0 j+1+N/2+P_3) \bmod N$.

In general, the values of $P_0$, $P_1$, $P_2$, and $P_3$ depend on N. Some prior art values for blocks of size 120, 240, 360, 480, and 600 bytes are listed in the following table.

| Data block size (bytes) | N | $P_0$ | $P_1$ | $P_2$ | $P_3$ |
|---|---|---|---|---|---|
| 120 | 480 | 13 | 240 | 120 | 180 |
| 240 | 960 | 13 | 480 | 240 | 720 |
| 360 | 1440 | 17 | 720 | 360 | 540 |
| 480 | 1920 | 17 | 960 | 480 | 1440 |
| 600 | 2400 | 17 | 1200 | 600 | 1800 |

When the values of $P_0$, $P_1$, $P_2$, and $P_3$ for each N are properly designed, the code performance will improve with increasing block size. Furthermore, no error floor will be discernable above a block error rate of $10^{-4}$. An error floor is a sudden decrease in the slope of the curve of the logarithm of the block error rate versus signal-to-noise ratio. Unfortunately, the performance of the CTC with the prior art parameters given in the previous table displays the opposite. With these parameters, the code performance degrades with increasing block size and a distinct error floor is present above a block error rate of $10^{-4}$. Consequently there exists a need for a method and apparatus for interleaving that alleviates the above-mentioned problems.

DETAILED DESCRIPTION OF THE DRAWINGS

In order to address the above-mentioned need, a method and apparatus for interleaving within a communication system is provided herein. More particularly parameters for the IEEE 802.16 convolutional turbo code interleaver are provided, and interleaving takes place utilizing the new parameters. The new parameters generate interleavers that have the correct turbo code behaviors of improving performance with increasing block size and an error floor well below a block error rate of $10^{-4}$. Furthermore, the parameters have no implementation impact. Interleaving in accordance with the preferred embodiment of the present invention can achieve a block error rate of $10^{-4}$ at a signal-to-noise ratio that is at least 0.5 dB, and in some cases up to 1.3 dB, smaller than that which can be achieved with the code using the prior art parameters.

The present invention encompasses a method for interleaving information bits. The method comprises the steps of grouping the information bits into couples (A0,B0), (A1,B1), (A2,B2), (A3,B3), . . . , (AN−1,BN−1), encoding (A0,B0), (A1,B1), (A2,B2), (A3,B3), . . . , (AN−1,BN−1) in a first encoder, and switching alternate couples to produce (A0,B0), (B1,A1), (A2,B2), (B3,A3), . . . , (BN−1,AN−1)=u1(0), u1(1), u1(2), u1(3), . . . , u1(N−1). The couples of sequence u1 are mapped onto an address j of an interleaved sequence, where a function P(j) provides the address of the couple of the sequence u1 that shall be mapped onto the address j of the interleaved sequence, wherein u2(j)=u1(P(j))=[u1(P(0)), u1(P(1)), u1(P(2)), u1(P(3)), . . . , u1(P(N−1))]. Finally u2 is encoded in a second encoder.

Values for N, $P_0$, $P_1$, $P_2$, and $P_3$ take the form

| Data block size (bytes) | N | $P_0$ | $P_1$ | $P_2$ | $P_3$ |
|---|---|---|---|---|---|
| 120 | 480 | 53 | 62 | 12 | 2 |
| 240 | 960 | 43 | 64 | 300 | 824 |
| 360 | 1440 | 43 | 720 | 360 | 540 |
| 480 | 1920 | 31 | 8 | 24 | 16 |
| 600 | 2400 | 53 | 66 | 24 | 2 |

The present invention additionally encompasses an apparatus. The apparatus comprises grouping circuitry outputting information bits into couples (A0,B0), (A1,B1), (A2,B2), (A3,B3), . . . , (AN−1,BN−1), first encoding circuitry receiving the couples and encoding (A0,B0), (A1,B1), (A2,B2), (A3,B3), . . . , (AN−1,BN−1), an interleaver switching alternate couples to produce (A0,B0), (B1,A1), (A2,B2), (B3, A3), . . . , (BN−1, AN−1)=u1(0), u1(1), u1(2), u1(3), . . . , u1(N−1) and mapping the couple of sequence u1 onto an address j of an interleaved sequence, where a function P(j) provides the address of the couple of the sequence u1 that shall be mapped onto the address j of the interleaved sequence, wherein u2(j)=u1(P(j))=[u1(P(0)), u1(P(1)), u1(P(2)), u1(P(3)), . . . , u1(P(N−1))]. Finally, a second encoder is provided receiving u2 and encoding u2.

Figure 1:
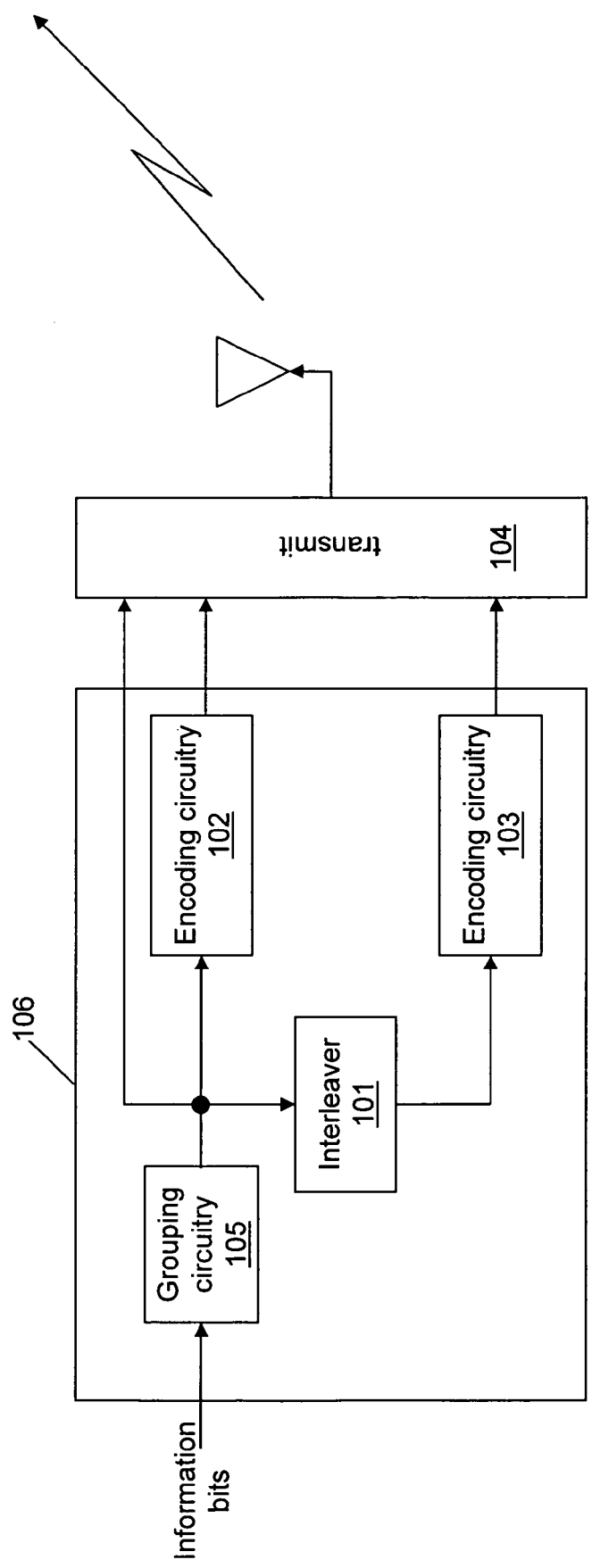
FIG. 1 is a block diagram of a transmitter.

Turning now to the drawings, wherein like numerals designate like components, FIG. 1 is a block diagram of transmitter 100. As shown, transmitter 100 comprises encoder 106 and transmission circuitry 104. Encoder 106 comprises interleaver 101, grouping circuitry 105, and encoding circuitry 102-103. During operation information bits enter encoder 106. Information bits typically include voice converted to data by a vocoder, pure data, or a combination of the two types of data. Encoder 106 converts input data into data symbols at a fixed encoding rate with an encoding algorithm which facilitates subsequent decoding of the data symbols into data bits (e.g. convolutional or block coding algorithms). For example, encoder 106 encodes input data (received at a rate of x kbit/second) at a fixed encoding rate of one data bit to three coded bits (i.e., rate ⅓) such that transmitter 104 receives coded bits at a rate of 3x kbit/second.

During encoding, information bits enter grouping circuitry 105 where they are grouped into pairs. Pairs may also be referred to as "couples". The output of grouping circuitry 105 is pairs of information bits, or information couples. Information couples enter both encoding circuitry 102 and interleaver 101. Interleaver 101 interleaves information couples. In particular, a plurality of information couples enter interleaver 101 in a first array and are then permuted using a known permutation scheme. The permuted information couples then enter encoding circuitry 103. Both the permuted and unpermuted information couples are encoded via encoding circuitry 102 and 103 with an encoding algorithm which facilitates subsequent decoding. The resulting encoded couples are then transmitted over-the-air via transmitter 104.

Interleaver 101 uses an almost regular permutation $$P(j)=(P_0 j+d(j)) \bmod N \quad (3)$$

where $0 \leq j \leq N-1$ is the sequential index, P(j) is the permuted index, N is the information block size in bit couples, $P_0$ is a number that is relatively prime to N, and d(j) is a dither vector. For example, in IEEE 802.16 d(j) assumes the form $$d(j) = \begin{cases} 1, & j \bmod 4 = 0 \\ 1 + N/2 + P_1 & j \bmod 4 = 1 \\ 1 + P_2 & j \bmod 4 = 2 \\ 1 + N/2 + P_3 & j \bmod 4 = 3 \end{cases} \quad (4)$$

for $0 \leq j \leq N-1$. Equations (3) and (4) are equivalent to the following pseudocode:

for j=0, . . . , N−1
switch j mod 4:
    case 0: P(j)=($P_0$j+1)mod N
    case 1: P(j)=($P_0$j+1+N/2+$P_1$)mod N
    case 2: P(j)=($P_0$j+1+$P_2$)mod N
    case 3: P(j)=($P_0$j+1+N/2+$P_3$)mod N In general, the values of $P_0$, $P_1$, $P_2$, and $P_3$ depend on N. As discussed above, for blocks of size 120, 240, 360, 480, and 600 bytes, when the prior art values of $P_0$, $P_1$, $P_2$, and $P_3$ are used the code performance degrades with increasing block size and a distinct error floor is present above a block error rate of $10^{-4}$.

In order to address this issue, interleaver 101 is designed to correct the performance deficiencies for blocks of size 120, 240, 360, 480, and 600 bytes. In particular, the values for N, $P_0$, $P_1$, $P_2$, and $P_3$ take the form shown in the following table.

TABLE 1

| values for N, $P_0$, $P_1$, $P_2$, and $P_3$ for differing block sizes | | | | | |
|---|---|---|---|---|---|
| Data block size (bytes) | N | $P_0$ | $P_1$ | $P_2$ | $P_3$ |
| 120 | 480 | 53 | 62 | 12 | 2 |
| 240 | 960 | 43 | 64 | 300 | 824 |
| 360 | 1440 | 43 | 720 | 360 | 540 |
| 480 | 1920 | 31 | 8 | 24 | 16 |
| 600 | 2400 | 53 | 66 | 24 | 2 |

Figure 2:
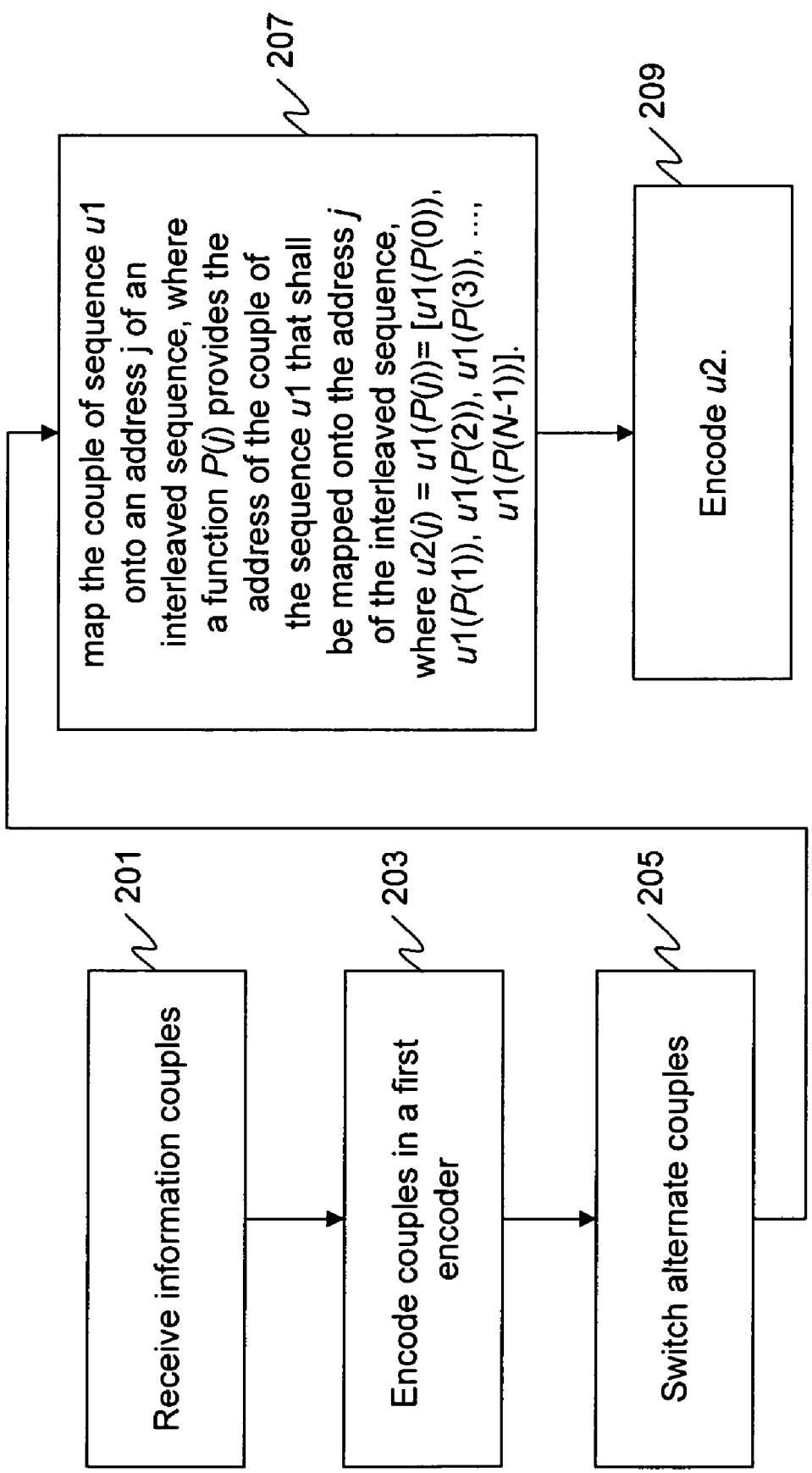
FIG. 2 is a flow chart showing operation of the interleaver of FIG. 1.

FIG. 2 is a flow chart showing operation of the interleaver of FIG. 1. During operation, information couples (A0,B0), (A1,B1), (A2,B2), (A3,B3), . . . , (AN−1,BN−1) are output by grouping circuitry 105 and are received by interleaver 101 (step 201). At step 203 (A0,B0), (A1,B1), (A2,B2), (A3, B3), . . . , (AN−1,BN−1) are encoded in a first encoder 102. At step 205 alternate couples are switched by interleaver 101 to produce (A0,B0), (B1,A1), (A2,B2), (B3,A3), . . . , (BN−1, AN−1)=u1(0), u1(1), u1(2), u1(3), . . . , u1(N−1)=u1. Next at step 207 interleaver maps the couple of sequence u1 onto an address j of an interleaved sequence, where a function P(j) provides the address of the couple of the sequence u1 that shall be mapped onto the address j of the interleaved sequence, where u2(j)=u1(P(j))=[u1(P(0)), u1(P(1)), u1(P(2)), u1(P(3)), . . . , u1(P(N−1))]. Finally, at step 209 the sequence u2 is output by interleaver 101 and encoded by second encoder 103.

The above logic flow can be summarized as follows:
Switching Alternate Couples:
Let the sequence u0=[(A0,B0), (A1,B1), (A2,B2), (A3, B3), . . . , (AN−1,BN−1)] be the input to first encoder 102.
for i=0 . . . N−1
  if (i mod 2==1) let (Ai, Bi)↔(Bi, Ai) (i.e., switch the couple)
This step gives a sequence u132 [(A0,B0), (B1,A1), (A2, B2),(B3,A3), . . . ,(BN−1,AN−1)]=[u1(0), u1(1), u1(2), u1(3), . . . , u1(N−1)].
(It should be noted that the above procedure also works if the even-numbered couples are switched (i.e., replace i mod 2==1 by i mod 2==0 above) or if there is no couple-switching at all.)
Determining the Function P(j):
The function P(j) provides the address of the couple of the sequence u1 that shall be mapped onto the address j of the interleaved sequence (i.e. u2(i)=u1(P(j))). for j=0, . . . , N−1
  switch j mod 4:
    case 0: $P(j)=(P_0j+1) \mod N$
    case 1: $P(j)=(P_0j+1+N/2+P_1) \mod N$
    case 2: $P(j)=(P_0j+1+P_2) \mod N$
    case 3: $P(j)=(P_0j+1+N/2+P_3) \mod N$
This step gives a sequence u2=[u1(P(0)), u1(P(1)), u1(P(2)), u1(P(3)), . . . , u1(P(N−1))]=[(BP(0),AP(0)), (AP(1),BP(1)), (BP(2),AP(2)), (AP(3),BP(3)), . . . , (AP(N−1),BP(N−1))]. Sequence u2 is the input to the second encoder 103.

As discussed above, values for N, $P_0$, $P_1$, $P_2$, and $P_3$ take the form table 1. The outputs of encoders 102 and 103 are sent along with the original data stream to transmitter 104 where the encoded u1, the encoded u2, and the non-encoded data stream is transmitted.

While the invention has been particularly shown and described with reference to a particular embodiment, it will be understood by those skilled in the art that various changes in form and details may be made therein without departing from the spirit and scope of the invention. It is intended that such changes come within the scope of the following claims.

The invention claimed is:

1. A method for an interleaver within an encoder to encode information bits, the method comprising the steps of:
  the interleaver grouping the information bits into couples (A0,B0), (A1,B1), (A2,B2), (A3,B3), . . . , (AN−1,BN−1);
  the encoder performing the steps of:
  encoding (A0,B0), (A1,B1), (A2,B2), (A3,B3), . . . , (AN−1,BN−1) in a first encoder;
  switching alternate couples to produce (A0,B0), (B1,A1), (A2,B2), . . . , (BN−1, AN−1)=u1(0), u1(1), u1(2), u1(3), . . . , u1(N−1);
  mapping the couples of sequence u1 onto an address j of an interleaved sequence, where a function P(j) provides the address of the couple of the sequence u1 that shall be mapped onto the address j of the interleaved sequence, wherein u2(j)=u1(P(j))=[u1(P(0)), u1(P(1)), u1(P(2)), u1(P(3)), . . . , u1(P(N−1))], and wherein for j=0, . . . , N−1
    switch j mod 4:
      case 0: $P(j)=(P_0j+1) \mod N$
      case 1: $P(j)=(P_0j+1+N/2+P_1) \mod N$
      case 2: $P(j)=(P_0j/+1+P_2) \mod N$
      case 3: $P(j)=(P_0j+1+N/2+P_3) \mod N$;

encoding u2 in a second encoder;
transmitting the encoded u1 and/or u2; and
where values for N, $P_0$, $P_1$, $P_2$, and $P_3$ take the form

| Data block size (bytes) | N | $P_0$ | $P_1$ | $P_2$ | $P_3$ |
|---|---|---|---|---|---|
| 120 | 480 | 53 | 62 | 12 | 2 |
| 240 | 960 | 43 | 64 | 300 | 824 |
| 360 | 1440 | 43 | 720 | 360 | 540 |
| 480 | 1920 | 31 | 8 | 24 | 16 |
| 600 | 2400 | 53 | 66 | 24 | 2 | and wherein (A0,B0), (A1,B1), (A2,B2), (A3,B3), . . . , (AN−1,BN−1) are information couples, N is an integer, and P(0) . . . P(N−1) are functions that provide the address of the couples.

2. The method of claim 1 further comprising the step of:
having a transmitter transmitting the encoded u1.

3. The method of claim 1 further comprising the step of:
having a transmitter transmitting the encoded u2.

4. The method of claim 1 further comprising the step of:
having a transmitter transmitting the couples;
having the transmitter transmitting the encoded u1; and
having the transmitter transmitting the encoded u2.

5. An apparatus comprising:
grouping circuitry outputting information bits into couples (A0,B0), (A1,B1), (A2,B2), (A3,B3), . . . , (AN−1,BN−1);
first encoding circuitry receiving the couples and encoding (A0,B0), (A1,B1), (A2,B2), (A3,B3), . . . , (AN−1,BN−1);
an interleaver switching alternate couples to produce (A0, B0), (B1,A1), (A2,B2), . . . , (BN−1, AN−1)=u1(0), u1(1), u1(2), u1(3), . . . , u1(N−1) and mapping the couples of sequence u1 onto an address j of an interleaved sequence, where a function P(j) provides the address of the couple of the sequence u1 that shall be mapped onto the address j of the interleaved sequence, wherein u2(j)=u1(P(j))=[u1(P(0)), u1(P(1)), u1(P(2)), u1(P(3)), . . . , u1(P(N−1))] and wherein for j=0, . . . , N−1
  switch j mod 4:
    case 0: $P(j)=(P_0j+1) \mod N$
    case 1: $P(j)=(P_0j+1+N/2+P_1) \mod N$
    case 2: $P(j)=(P_0j+1+P_2) \mod N$
    case 3: $P(j)=(P_0j+1+N/2+P_3) \mod N$;
a second encoder, receiving u2 and encoding u2;
transmitting the encoded u1 and/or u2; and
where values for N, $P_0$, $P_1$, $P_2$, and $P_3$ take the form

| Data block size (bytes) | N | $P_0$ | $P_1$ | $P_2$ | $P_3$ |
|---|---|---|---|---|---|
| 120 | 480 | 53 | 62 | 12 | 2 |
| 240 | 960 | 43 | 64 | 300 | 824 |
| 360 | 1440 | 43 | 720 | 360 | 540 |
| 480 | 1920 | 31 | 8 | 24 | 16 |
| 600 | 2400 | 53 | 66 | 24 | 2 | and wherein (A0,B0), (A1,B1), (A2,B2), (A3,B3), . . . , (AN−1,BN−1) are information couples, N is an integer, and P(0) . . . P(N−1) are functions that provide the address of the couples.

6. The apparatus of claim 5 further comprising:
a transmitter transmitting the encoded u1.

7. The apparatus of claim 5 further comprising:
a transmitter transmitting the encoded u2.

8. The apparatus of claim 5 further comprising:
a transmitter transmitting the encoded u1, u2, and the couples.

* * * * *